United States Patent [19]  
Chiba et al.

[11] 3,972,575  
[45] Aug. 3, 1976

[54] CAGE FOR ROLLER BEARING  
[75] Inventors: Moichi Chiba, Yokosuka; Seiji Higuchi, Tokyo, both of Japan  
[73] Assignee: The Torrington Company, Torrington, Conn.  
[22] Filed: June 23, 1975  
[21] Appl. No.: 589,072

[30] Foreign Application Priority Data  
July 3, 1974 Japan............................. 49-77810

[52] U.S. Cl. ............................................. 308/235  
[51] Int. Cl.² ........................................ F16C 33/38  
[58] Field of Search...................... 308/217, 235, 219

[56] References Cited  
UNITED STATES PATENTS  
1,734,222   11/1929   Marles ............................. 308/235  
3,163,478   12/1964   Pitner .............................. 308/235  
3,778,124   12/1973   Alling .............................. 308/235

Primary Examiner—M. H. Wood, Jr.  
Assistant Examiner—Richard A. Bertsch  
Attorney, Agent, or Firm—Frank S. Troidl

[57] ABSTRACT

The cage includes two interconnected members. Each member has a plurality of circumferentially spaced openings; the openings in one member aligned with and spaced from the openings in the other member to form pockets for rollers.

A portion of each long side of the openings is adapted to retain the rollers. Each interconnected member has tongues adjacent the openings. The tongues extend toward the other member with the tongues on one interconnected member facing and circumferentially spaced from the tongues on the other interconnected member. The spacing between the tongues in each pocket is chosen so that the tongues act as guide surfaces for the rollers.

3 Claims, 4 Drawing Figures

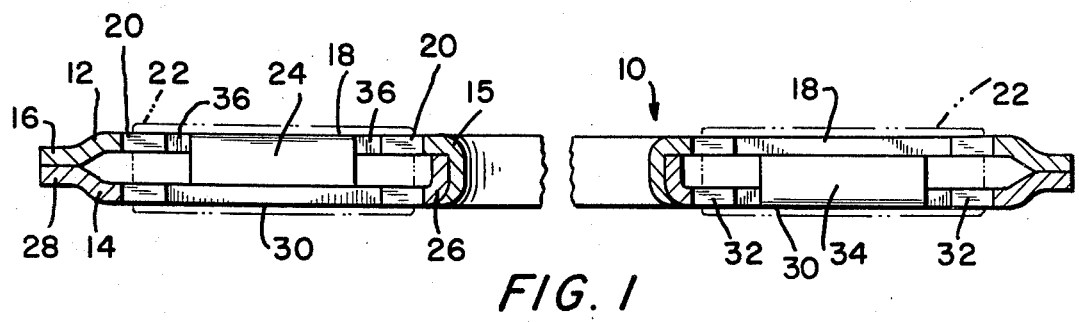
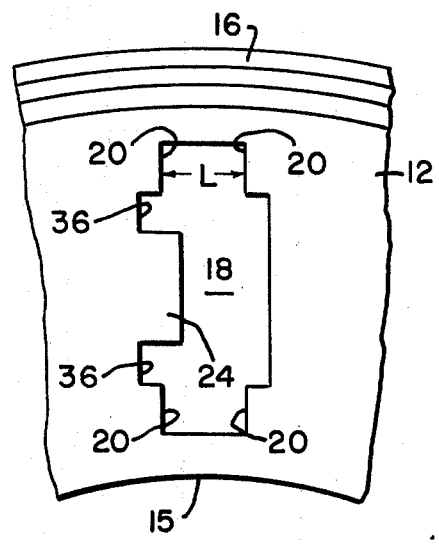
FIG. 2
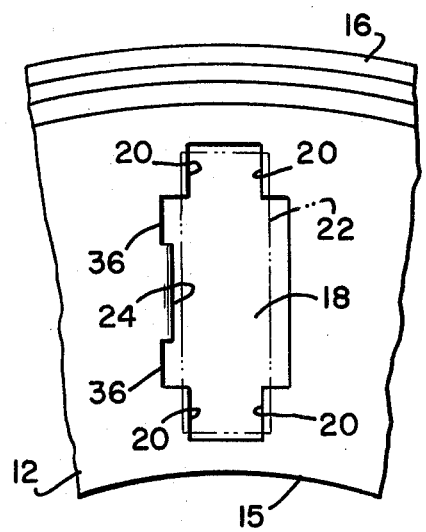
FIG. 3
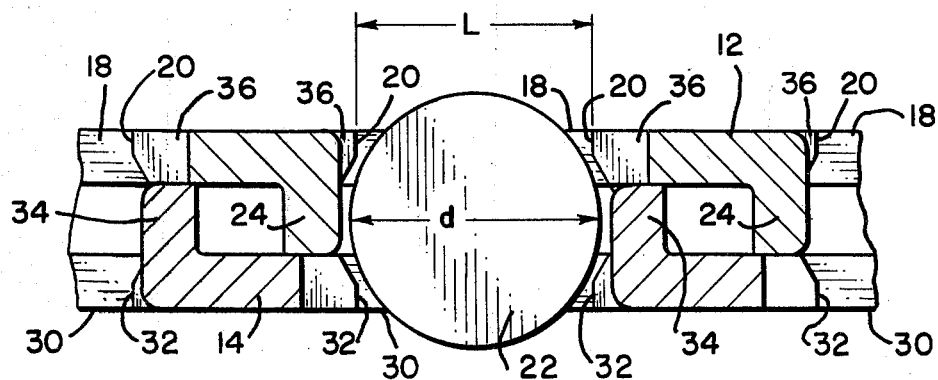
FIG. 4

CAGE FOR ROLLER BEARING

BACKGROUND OF THE INVENTION

1. Field of the Invention

This invention relates to bearings. More particularly, this invention is a new and improved roller bearing cage.

2. Description of the Prior Art

Some currently used roller bearing cages are made by interconnecting two cage members. The cage members are often press-formed into a unified member.

In most of the conventional roller-cages of this category, the rollers are both retained in position and guided by an edge section of an opening that prevents the roller from falling off of position. The contact area between the edge section of an opening or edge section of a cage bar with the corresponding rollers is so large that friction and torque due to this contact surface area are both large. As a result the cage pieces are often squeezed between a roller and a race due to insufficient lubrication or due to vibration in the course of the use thereof and separated.

SUMMARY OF THE INVENTION

The present new and improved roller bearing cage has been invented for the specific purpose of eliminating the above mentioned defects which are inevitably involved in the currently used conventional press cages.

BRIEF DESCRIPTION OF THE DRAWINGS

The invention as well as its many advantages may be further understood by reference to the following detailed description and drawings in which:

FIG. 1 is a profile of a preferred embodiment of the cage for a thrust roller bearing;

FIG. 2 is a plan view of a retaining member showing an example of the shape of an opening prior to forming the tongue piece by bending;

FIG. 3 is a view similar to FIG. 2 after bending the tongue piece shown in FIG. 2; and FIG. 4 is a sectional view, on an enlarged scale, showing the inter-relationship between the roller and the roller openings.

DESCRIPTION OF THE PREFERRED EMBODIMENTS

In the various figures, like parts are referred to by like numbers.

The cage 10 is formed by joining cage members 12 and 14. The cage member 12 is provided with rims 15 and 16 on the internal and external peripheries, respectively. A plurality of circumferentially spaced substantially rectangular openings 18 are formed in the cage member 12.

The long sides of roller openings 18, have roller retaining portions 20. The retaining portions 20 prevent a roller 22 from falling off position.

As shown in FIG. 4, one side of each of the openings 18 includes a tongue 24 which extends toward the cage member 14. In the preferred embodiment shown, the tongues 24 extend entirely across the space between the two interconnected members 12 and 14, and contact the cage member 14.

The cage member 14 is provided with rims 26 and 28 (see FIG. 1) on the internal and external peripheries, respectively. Cage member 14 is provided with circumferentially spaced apart openings 30, which are spaced from and aligned with corresponding openings 18 in the cage member 12. A portion of the long sides of the roller openings 30 are provided with roller retaining members 32 (see FIG. 4). The tongue 34 extends from the cage member 14 entirely across the space between the cage members 12 and 14 and contacts the cage member 12.

FIG. 2 and FIG. 3 illustrate the method of making the tongue member 24. As shown in FIG. 2, openings 36 have been previously punched in the cage member 12. The punching operation left a portion 24 on one long side of the opening 18. The portion 24, as shown in FIG. 2 and FIG. 3, is then bent axially to form the tongue 24 shown in FIG. 4.

The spacing (L) between the roller retaining members is less than the diameter (d) of the rollers 22 so the roller is retained in the pockets formed by the aligned and separated openings 18 and 30. However, the spacing between the facing tongues 24 and 34 is greater than the distance (L) between the retaining members and slightly more than the diameter (d) of rollers 22. Thus the tongues 24 and 34 act as guide surfaces for the rollers 22.

The interfitted or interconnected cage members 12 and 14 support the rollers 22 by the proper relationship of the width (L), the roller diameter (d), and the spacing between the tongues as shown in FIG. 4. The cage members 12 and 14 are formed into a unitary cage as illustrated in FIG. 1. To assemble the new cage, the rollers 22 may be arranged in place in the roller openings in one cage member and then the other cage member press-fitted into the first cage member. However, if the amount of engagement of the roller into the roller member openings is small, the retaining members 12 and 14 may be connected together and the rollers 22 then pushed into the pockets formed by the aligned openings 18 and 30.

As set forth above, the rollers are prevented from falling off position by virtue of the retaining portions on each of the long sides of the openins and the rollers are properly guided by the tongues 24 and 34. The tongues 24 and 34 are constructed so that they come into contact with the section of the maximum diameter (d) of the roller; therefore, the rollers are completely free from abrasion and displays superb revolving performance at low torque. The cage can be kept completely free from the hazard of being squeezed between a race and the roller and thus separated, even in cases where the cage is subjected to high vibration or poor lubrication.

In the illustrated embodiment, the tongues 24 and 34 are formed by a simple bending in the axial direction. However, if desired, the tongues 24 and 34 might be formed differently, such as a U-shape.

The description of the new cage is given with regard to a thrust roller bearing; but it is to be understood that the cage is likewise applicable to a roller bearing of the radial type.

We claim:

1. In a bearing cage with two interconnected members each member having a plurality of circumferentially spaced substantially rectangular openings with the openings in one member being aligned with and spaced from the openings in the other member to form roller pockets, a portion of each long side of each opening being adapted to retain rollers placed in the pockets, the improvement comprising:

a tongue on one long side of each opening and in all pockets, the tongue on one interconnected member extending toward the other interconnected member and facing the tongue on said other interconnected member, the circumferential spacing between the tongues in each pocket being such that the tongues act as guide surfaces for the rollers.

2. A bearing in accordance with claim 1 wherein: the tongues on each interconnected member extend entirely across the space between the two interconnected members and contact the other interconnected member.

3. A bearing in accordance with claim 1 wherein: the circumferential spacing between the tongues of each pocket is slightly more than the diameter of rollers to be retained by the bearing cage.

* * * * *